(12) United States Patent
Naito

(10) Patent No.: US 6,329,769 B1
(45) Date of Patent: Dec. 11, 2001

(54) ELECTRON BEAM IRRADIATION DEVICE

(75) Inventor: Yoshihiko Naito, Kanagawa-ken (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/275,786

(22) Filed: Mar. 25, 1999

(30) Foreign Application Priority Data

Mar. 27, 1998 (JP) ................................. 10-100406

(51) Int. Cl.[7] .................................................. H01J 29/70
(52) U.S. Cl. .......................... 315/370; 315/366; 313/433; 313/440
(58) Field of Search ..................... 315/364, 366, 315/370, 371; 313/412, 413, 414, 442, 443, 433, 461, 463, 431, 440

(56) References Cited

U.S. PATENT DOCUMENTS 5,117,152 * 5/1992 Duwaer et al. ....................... 313/440
6,140,756 * 10/2000 Hosotani ............................ 313/477 R
6,166,484 * 12/2000 Okuyama et al. ...................... 313/440

FOREIGN PATENT DOCUMENTS 7-192673    7/1995   (JP) .
10-266991   10/1998  (JP) .
10-299688   11/1998  (JP) .

* cited by examiner

*Primary Examiner*—David Vu
*Assistant Examiner*—Wilson Lee
(74) *Attorney, Agent, or Firm*—Armstrong, Westerman, Hattori, McLeland, & Naughton, LLP

(57) ABSTRACT

To provide an electron beam irradiation device capable of avoiding a problem of convergence of an electron beam at the maximum scanning points, and constantly obtaining an irradiated region of uniform energy density, an electron beam irradiation device comprising an electron beam source 12, an accelerating tube 13 for accelerating electrons emitted from said electron beam source, a focusing electromagnet 16 for applying a magnetic field to a high energy electron beam, which is formed by the accelerating tube, for controlling the beam diameter of the electron beam, and an electromagnet 17 for deflecting and scanning the beam-diameter-controlled electron beam by applying a magnetic field to the electron beam, wherein an electric current component $I_F$ which is synchronized with an electric current $I_S$ of the scanning electromagnet 17 is superimposed on an electric current IF of the focusing electromagnet 16, thereby controlling the electric current $I_F$ of the focusing electromagnet in a manner that said beam diameter becomes maximum at the maximum scanning points.

4 Claims, 7 Drawing Sheets

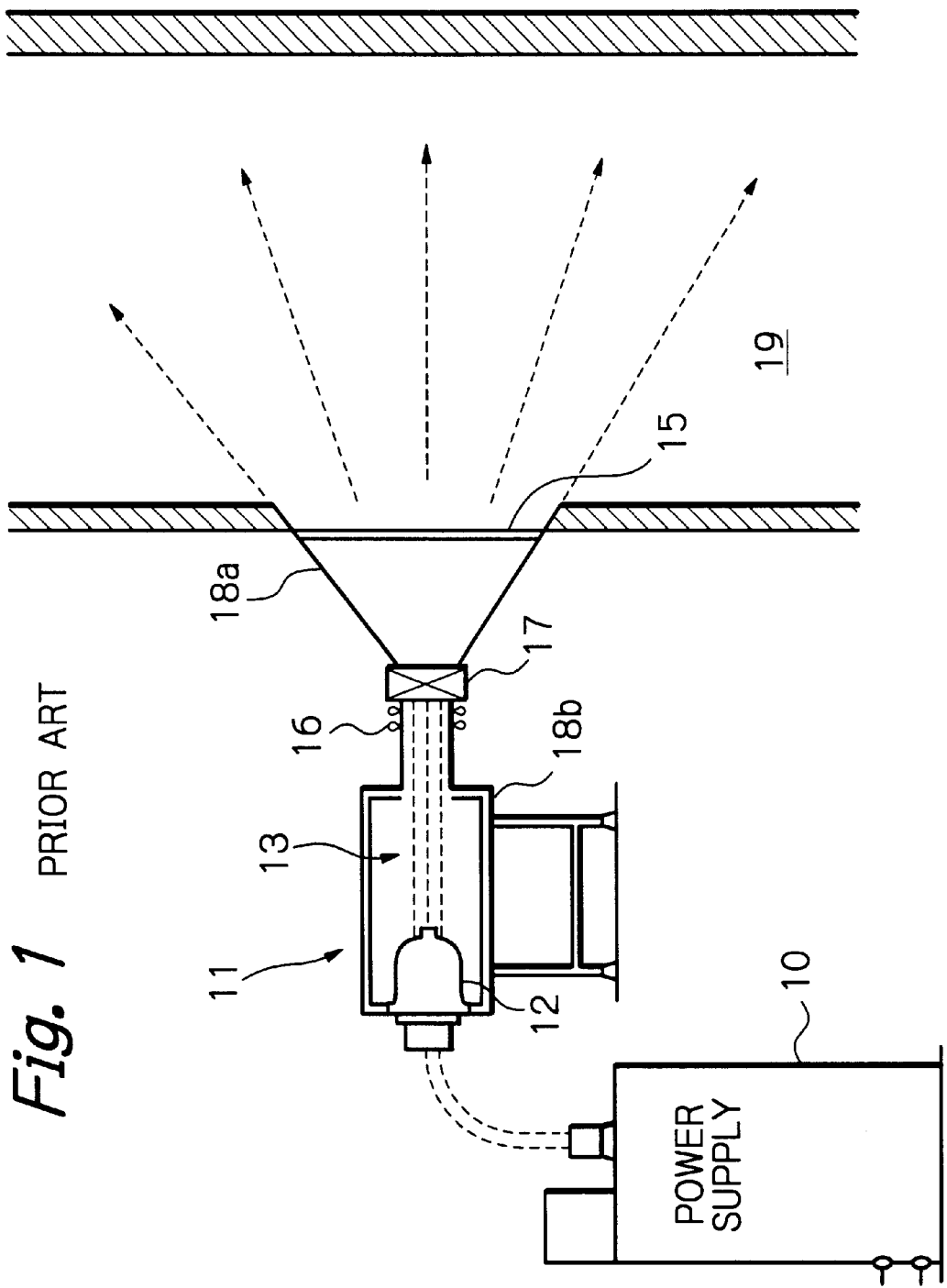

ELECTRON BEAM IRRADIATION DEVICE

BACKGROUND OF THE INVENTION

The present invention relates to an electron beam irradiation device and method and, more specifically, to an electron beam irradiation device and an electron beam irradiation method which are utilized for removing harmful constituents contained in exhaust gas discharged from, for example, a steam power station.

It is considered that greenhouse effect, acid rain and other effects due to air pollution, which have become the problems throughout the world, originate from constituents such as SOx, NOx, etc., which are included in combustion exhaust gas exhausted from, for example, a thermal power station, etc. One method, which is practiced, for removing harmful constituents such as SOx, NOx, etc., is to irradiate an electron beam on the combustion exhaust gas, thereby carrying out desulfurization and denitration (removal of harmful constituents such as SOx, NOx, etc.).

FIG. 1 shows an example of an electron beam generation device which is used for the above application. The combustion exhaust gas processing device mainly comprises: a power supply 10 which generates a high DC voltage; an electron beam irradiation device 11 which irradiates an electron beam on the combustion exhaust gas; and a flow path 19 for the combustion exhaust gas which is placed along an irradiation window 15 which is an exit for the electron beam irradiated by the device 11. The electron beam, which is emitted from the irradiation window 15 to the outside, irradiates molecules of oxygen ($O_2$), steam ($H_2O$), etc., in the combustion exhaust gas, wherein the irradiation window 15 comprises, for example, a thin film of titanium, etc. By receiving the irradiation, these molecules become free radicals such as OH, O, $HO_2$, etc., which have very strong oxidative power. These free radicals oxidize harmful constituents such as SOx, NOx, etc., and form intermediate products such as sulfuric acid, nitric acid, etc. These intermediate products chemically react with ammonia gas ($NH_3$) which is injected in advance, and become ammonium sulfate and ammonium nitrate. The ammonium sulfate and ammonium nitrate are recovered as materials for fertilizer. By using such an exhaust gas processing system, it becomes possible to remove harmful constituents such as SOx, NOx, etc., from the combustion exhaust gas, and recover byproducts such as ammonium sulfate and ammonium nitrate which can be used as materials of fertilizer.

The electron beam generation device 11 mainly comprises: a thermoelectron generation source 12 such as a thermoelectron filament, etc.; an accelerating tube 13 for accelerating electrons emitted from the thermoelectron generation source 12; a focusing electromagnet 16 for applying a magnetic field to a high energy electron beam formed by the accelerating tube, thereby controlling the beam diameter of the electron beam; and a scanning electromagnet 17 for applying a magnetic field to the electron beam, of which beam diameter is controlled, thereby deflecting the electron beam. These elements are contained within enclosing elements 18a and 18b and are held in a high vacuum atmosphere. The thus formed high energy electron beam is deflected and scanned by the magnetic field applied by the scanning electromagnet 17, and emitted from the irradiation window 15 to a predetermined area of the flow path 19 of the exhaust gas.

FIG. 2(a) is a drawing which shows deflecting and converging of a beam which is formed by a conventional focusing electromagnet and a scanning electromagnet. For example, thermoelectrons generated by a thermoelectron generation source 12 such as a filament, etc., are accelerated and converged by a high voltage of, for example, about 1 MV at the accelerating tube 13 and becomes a high speed electron beam. Then, to enlarge or reduce the beam diameter, the beam diameter is controlled by the focusing electromagnet 16 for converging to a beam of a constant diameter. In this construction, the focusing electromagnet 16 is an electromagnet which comprises a ring-shape coil which is placed around the main axis. By the focusing electromagnet, a magnetic field is formed symmetrically with respect to the axis in the direction of the beam axis, and the beam diameter is controlled in accordance with the magnitude and direction of the magnetic field. For the above purpose, a direct electric current $I_O$, as shown in FIG. 3(b), is supplied to the electromagnet.

The electron beam, of which beam diameter is controlled by the focusing electromagnet 16, is scanned toward x and y directions by the scanning electromagnet 17. In this construction, the scanning electromagnet 17 is an electromagnet which comprises two sets of magnetic poles capable of deflecting an electron beam to x and y directions. By controlling the magnitude and direction of the electric current which is supplied to the coil of the electromagnet, the deflection angles in the x and y directions are controlled, the electron beam is scanned and the irradiated location of the electron beam is controlled. To this end, a sinusoidal AC current $I_S$, as shown in FIG. 3(a), is supplied to the electromagnet coil. As a result, to the irradiation window 15, an electron beam is scanned in the left and right directions in FIG. 2(b) as shown therein. It should be noted that, in FIG. 2(a), the scan in the vertical direction is abbreviated for convenience of explanation.

SUMMARY OF THE INVENTION

However, when an electron beam is scanned in the x direction by using the scanning electromagnet 17, if the angle of deviation near the maximum scanning points A and B is large, such a problem has arose that the outgoing angle of the electron beam is made different in accordance with the incident angle thereof due to the deflection effect of the magnetic field created by the electromagnet and that the electron beam converges to a focal point due to an effect like a convex lens. In other words, it is expected to obtain a uniform beam pattern as is shown by a broken line in FIG. 2(b), but, actually, the irradiation of the beam is particularly concentrated on the maximum scanning points A and B which are located at the left and right sides of the hatched region in the figure. When the electron beam is concentrated on the places near the maximum scanning positions A and B as mentioned above, the energy density of these places is increased and, as a result, such a problem has arose that the irradiation window may be damaged. Also, some regions which is not irradiated by the electron beam are formed at the places near the maximum scanning positions A and B. As a result, removal of the harmful constituents from combustion exhaust gas cannot be done sufficiently.

The present invention has been made to solve the above problems. An object of the present invention is to provide an electron beam irradiation device capable of avoiding the problem of convergence of the electron beam at the maximum scanning points, and constantly and wholly obtain an irradiated region of uniform energy density.

An electron beam irradiation device according to the present invention comprises: an electron beam source; an accelerating tube for accelerating electrons emitted from said electron beam source, a focusing electromagnet for applying a magnetic field to a high energy electron beam, which is formed by said accelerating tube, thereby controlling a beam diameter of the electron beam; and an electromagnet for applying a magnetic field to said electron beam to deflect and scan the electron beam of which beam diameter is controlled; the electron beam irradiation device characterized in that an electric current component which is synchronized with an electric current of said scanning electromagnet is superimposed on an electric current of said focusing electromagnet, thereby controlling the electric current of said focusing electromagnet in such a manner that said beam diameter becomes maximum at said maximum points of said scan.

According to the present invention, by superimposing, on an DC electric current of the focusing electromagnet, an electric current component which is synchronized with an electric current of the scanning electromagnet, an electric current of the focusing electromagnet is controlled to maximize the beam diameter at the maximum scanning points, that is, at the points where the angle of deviation becomes maximum, and, under a conventional scan, the beam diameter is converged. By means of the above, since the beam diameter is maximized at the maximum scanning points (i.e., at the points of the maximum deviation angle), it is possible to extend an apparent focal length and to avoid convergence of the beam diameter on an irradiation window portion. As a result, an irradiation density of the electron beam at the irradiation window portion becomes uniform, a damage of the irradiation window portion can be avoided and an electron beam is uniformly irradiated from the irradiation window portion, whereby the electron beam uniformly irradiates combustion exhaust gas and a satisfactory removal of harmful constituents can be achieved.

The present invention is further characterized in that an electric current of said scanning electromagnet is a sinusoidal AC electric current, that an electric current of the focusing electromagnet is formed by superimposing, on a DC electric current, a sinusoidal AC electric current having a frequency twice as high as the electric current of said scanning electromagnet and that the electric current of said focusing electromagnet is controlled in synchronism so as to maximize said beam diameter at the maximum positive and negative values of the electric current of said scanning electromagnet. By means of the above, the beam diameter can be maximized at the maximum points of scan in the positive and negative directions, respectively.

It may be possible that an electric current of said scanning electromagnet is a triangular-wave-shaped AC current, that an electric current of said focusing electromagnet is formed by superimposing, on a DC electric current, a sinusoidal AC electric current which has a frequency twice as high as the electric current of said scanning electromagnet and that an electric current of the focusing electromagnet is controlled in synchronism so as to maximize said beam diameter at the maximum values in positive and negative directions of the electric current of said scanning electromagnet. By means of the above, the beam diameter can also be maximized at the maximum points of scan in the positive and negative directions, respectively.

A method of irradiating an electron beam according to the present invention is characterized by the steps of: controlling the beam diameter of a high energy electron beam by applying a first magnetic field to the electron beam; applying a second magnetic field to said electron beams to deflect and scan said electron beam, of which diameter is controlled; and controlling said first magnetic field so as to maximize said beam diameter at the maximum points of scan. It should be understood that the waveform of an electric current of the scanning electromagnet is not limited to the above described sinusoidal and triangular-wave-shapes, and, needless to say, any electric current waveform which provide a uniform beam pattern on the irradiation window can achieve the object.

By means of the above, even in the case of scanning a high energy electron beam with a relatively large deviation angle, it becomes possible to obviate the problem of convergence of a beam and, consequently, to irradiate a wide scanning surface by an electron beam of a uniform energy density. As a result, in such an application as an electron beam irradiation device which is used for exhaust gas processing, it is possible to supply an electron beam of a uniform density to a relatively large irradiated surface. Also, it is possible to make the deviation angle larger, thereby reducing the size of the device. Similar effect can be expected to be achieved when the present invention is applied to a variety of devices which use electron beams such as an electron beam welding device, a scanning electron microscope, etc., in addition to an electron beam irradiation device for exhaust gas processing.

Other objects of the invention will become apparent from the following detailed description of the embodiments of the present invention when taken in conjunction with the appended drawings.

BRIEF DESCRIPTION OF THE DRAWINGS

FIG. 1 schematically shows a conventional exhaust gas processing device utilizing an electron beam irradiation device.

DETAILED DESCRIPTION OF THE INVENTION

An embodiment of the present invention will be described with reference to FIGS. 4($a$) to 7($b$). In the figures, the same reference symbols represent the same or equivalent components.

Figure 2A:
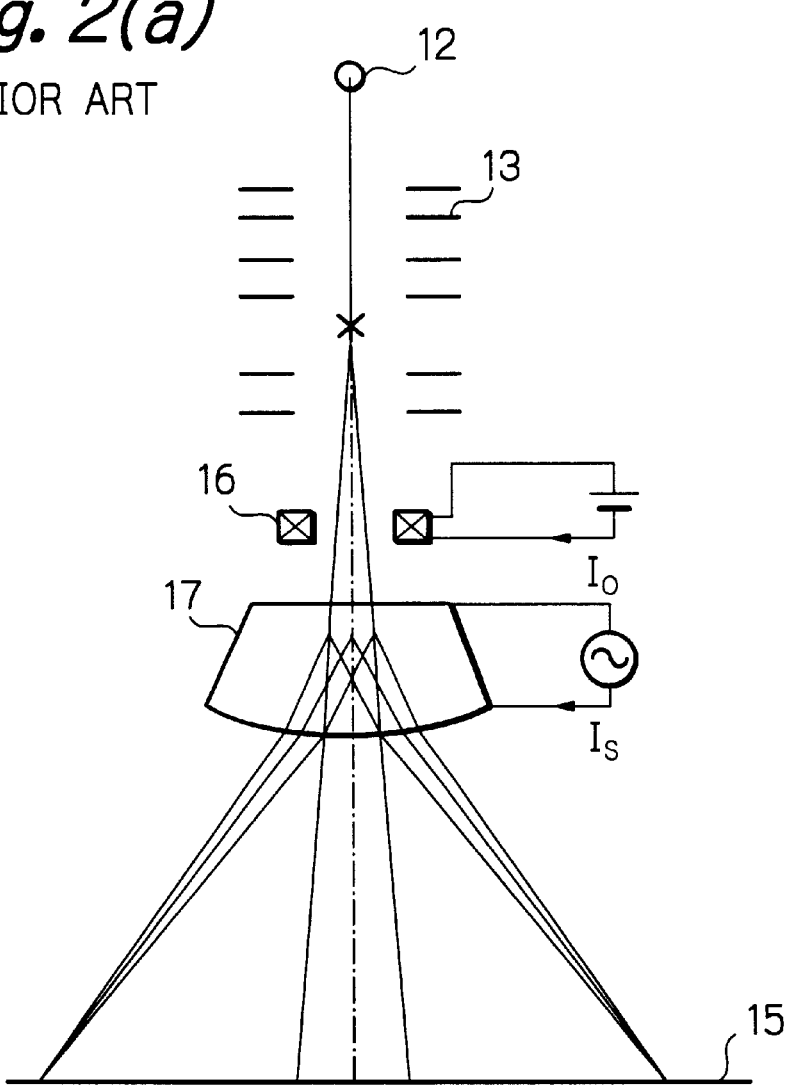
FIG. 2($a$) is an explanatory diagram of the prior art, showing how an electron beam is deflected, and FIG. 2($b$) shows an irradiation pattern of the electron beam.
Figure 2B:
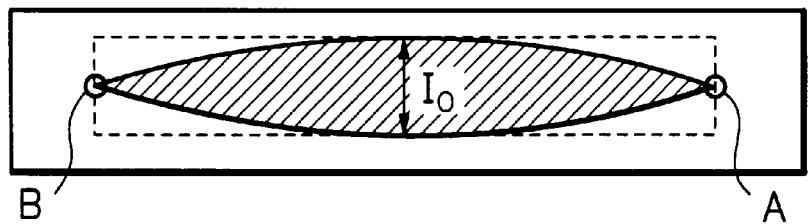
Figure 3A:
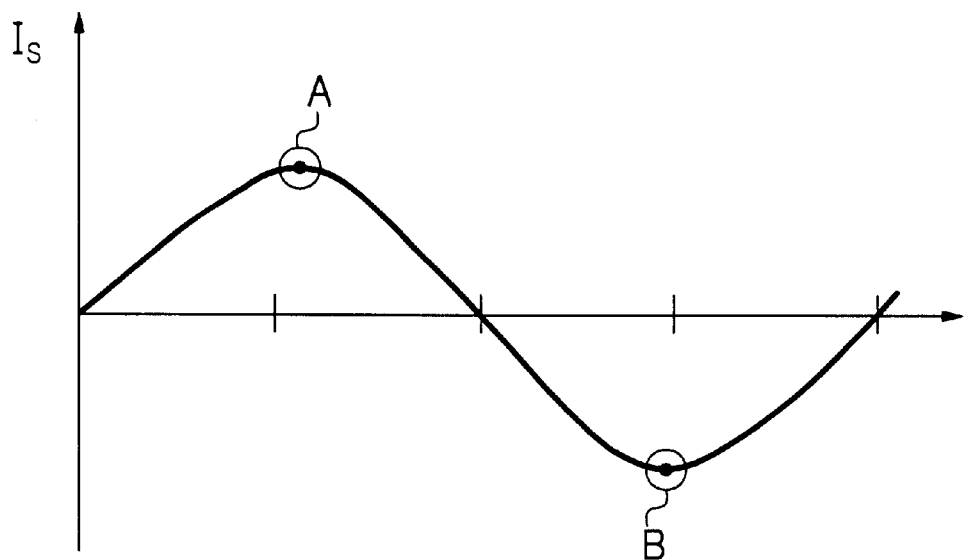
FIG. 3($a$) indicates an electric current of a scanning electromagnet, and FIG. 3($b$) shows an electric current of a focusing electromagnet of the prior art.
Figure 3B:
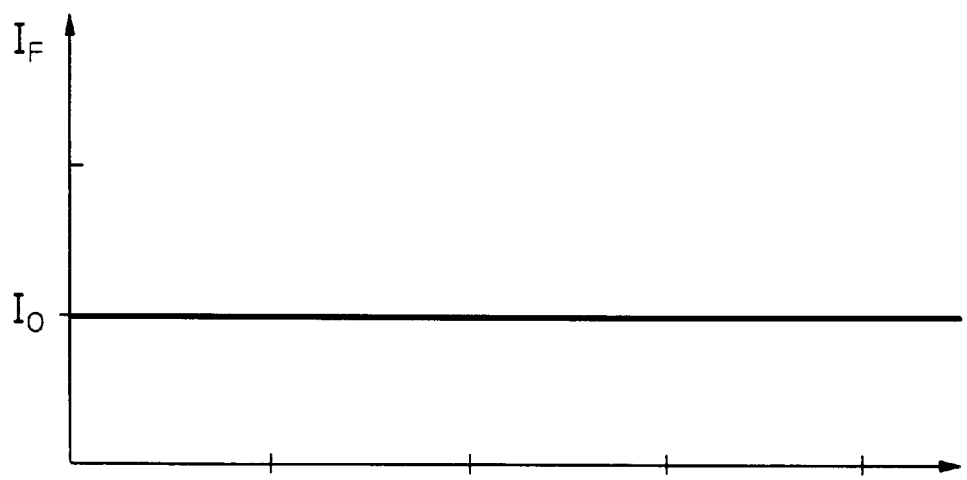
Figure 4A:
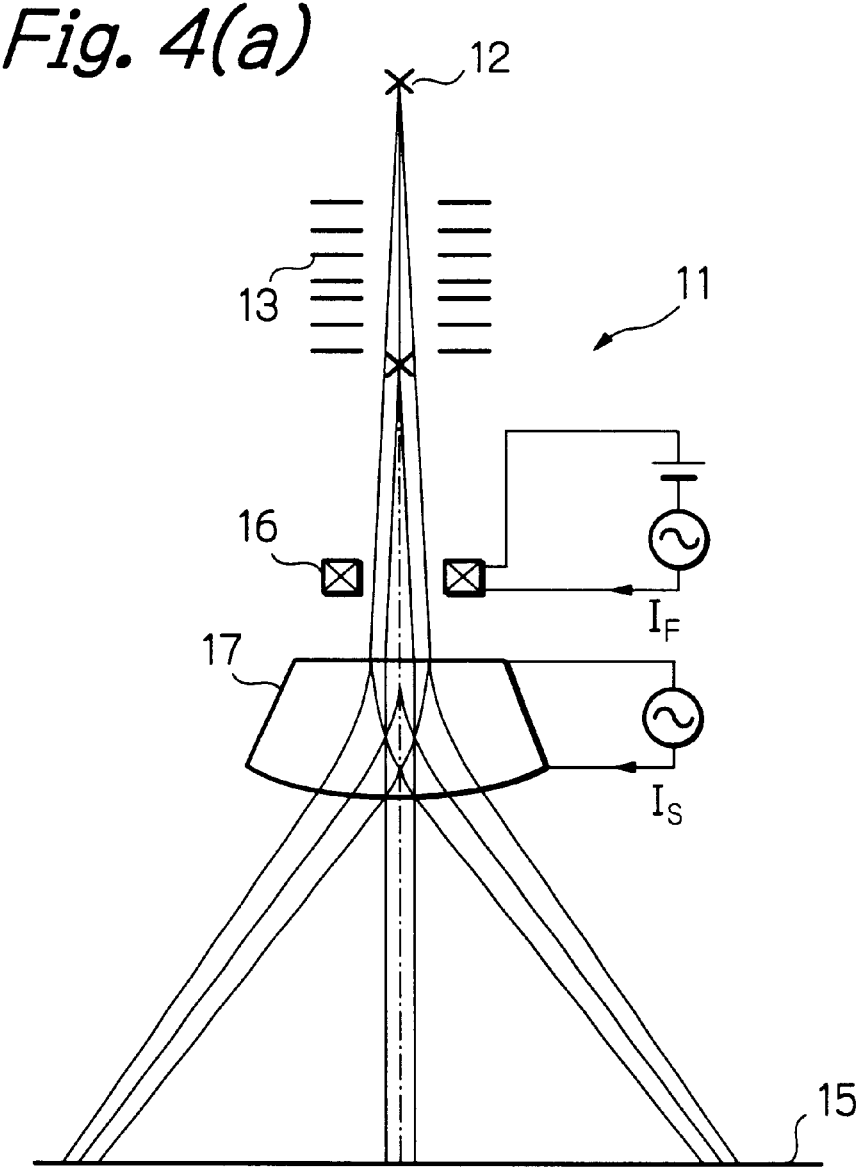
FIG. 4($a$) shows the structure of the first embodiment of an electron beam irradiation device according to the present invention, showing how an electron beam is deflected, and FIG. 4($b$) shows an irradiation pattern of the electron beam shown in FIG. 4($a$).
Figure 4B:
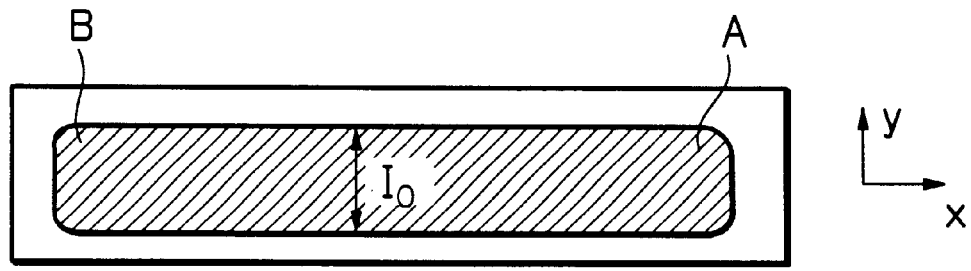
Figure 5A:
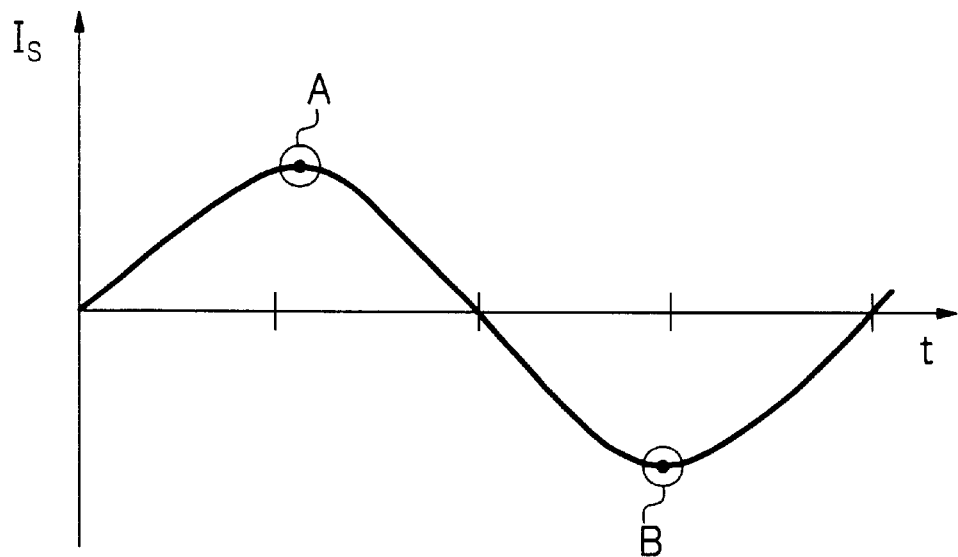
FIG. 5($a$) indicates an electric current of a scanning electromagnet of the first embodiment of the present invention, and FIG. 5($b$) shows an electric current of a focusing electromagnet of the first embodiment of the present invention.
Figure 5B:
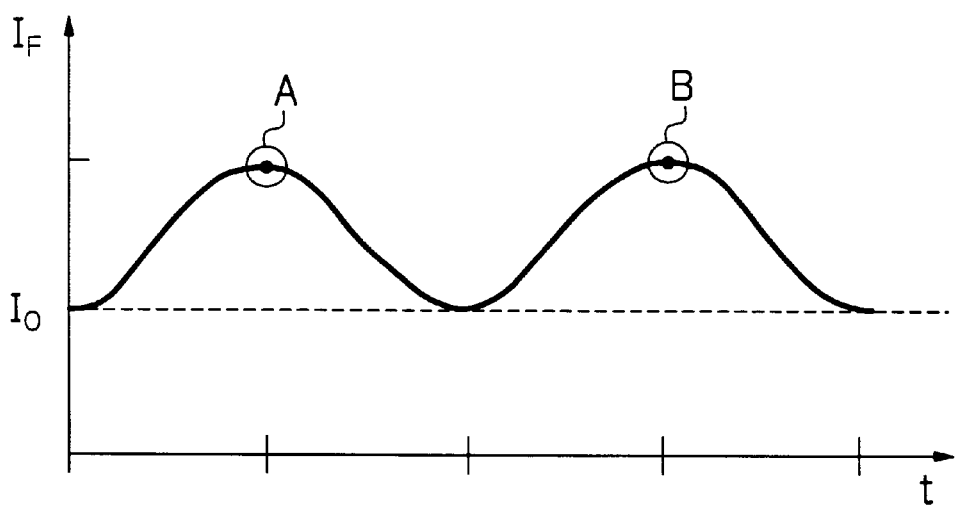

FIG. 4(a) shows how a beam which is formed by a focusing electromagnet and a scanning electromagnet of one embodiment according to the present invention is deflected, and FIG. 4(b) shows an irradiation pattern of the electron beam on an irradiated surface. FIG. 5(a) indicates an electric current of a scanning electromagnet according to the first embodiment of the present invention and FIG. 5(b) shows an electric current of a focusing electromagnet according to the first embodiment of the present invention. This electron beam irradiation device 11 comprises an electron beam source 12, an accelerating tube 13, a focusing electromagnet 16, and a scanning electromagnet 17. The structure where an electron beam accelerated and scanned by a magnetic field of the scanning electromagnet 17 is emitted from an irradiation window 15 is the same as that of the prior art. Also, similarly to the prior art, the device 11 is constructed to use a high voltage of about 1 MV in the accelerating tube 13 to accelerate an electron beam having high speed to control the beam diameter of the electron beam by the focusing electromagnet 16 and to deflect the electron beam, of which beam diameter is controlled, to a predetermined region for scan. The width of this scan is about 3–4 m in a longer side direction (x direction) and about 30–40 cm in a shorter side direction (y direction).

In the present invention, in the irradiation device, an electric current component which is synchronized with an AC electric current $I_S$ of the scanning electromagnet is superimposed on a DC electric current $I_O$ of the focusing electromagnet 16. FIG. 5(a) shows the AC electric current $I_S$ which is supplied to a coil of the electromagnet for X direction scan. The X direction scan is conducted by supplying a sinusoidal electric current to the coil of the scanning electromagnet. When the value of the sinusoidal electric current which is supplied to the coil of the scanning electromagnet becomes a maximum value, the largest magnetic field is formed, whereby, the deviation angle of the electron beam becomes maximum and the scanning point of the electron beam is located at the maximum point A of the right side in FIG. 4(b). When the value of the sinusoidal electric current becomes a maximum negative value, the scanning point of the electron beam is located at the maximum point B of the left side in FIG. 4(b). It is noted that, although scanning in the Y direction is also conducted, the problem relating to convergence of the beam diameter does not occur since the scanning width in the Y direction is narrower than that in the X direction.

On the other hand, is supplied to the coil of the focusing electromagnet 17, an electric current $I_F$ formed by superimposing, on a DC current $I_O$, an AC electric current component which has a frequency twice as high as and is synchronized with the current $I_S$. In other words, the DC current $I_O$ of the focusing electromagnet is controlled to enlarge the beam diameter, and, on the DC current $I_O$, an AC electric current of a frequency twice as high as the electric current $I_S$ of the scanning electromagnet 17 is superimposed in such a manner that the maximum values of the AC electric current are respectively synchronized with the maximum positive and negative points A and B of the sinusoidal electric current of the scanning electromagnet 17.

By means of the above construction, at the maximum points A and B up to which the electron beam is deflected right and left by the scanning electromagnet 17, the current $I_F$ which is supplied to the focusing electromagnet 16 becomes maximum and, at that time, the beam diameter becomes maximum. Therefore, when the electron beam enters the magnetic field of the scanning electromagnet 17 and is deviated, the beam is incident to be diverged, and, consequently, the apparent focal length is lengthened, thereby avoiding convergence of the electron beam on the irradiation window 15. As a result, it is possible to obviate the convergence phenomenon of the electron beam which occurs at a large deviation angle in the prior art, that is, the concentration of the energy density, and, to obtain an irradiation pattern of a constant energy density as shown in FIG. 4(b), regardless of scanning positions. Consequently, such problems caused by convergence of the electron beam at the irradiation window 15 as a damage by burning can be prevented.

Figure 6A:
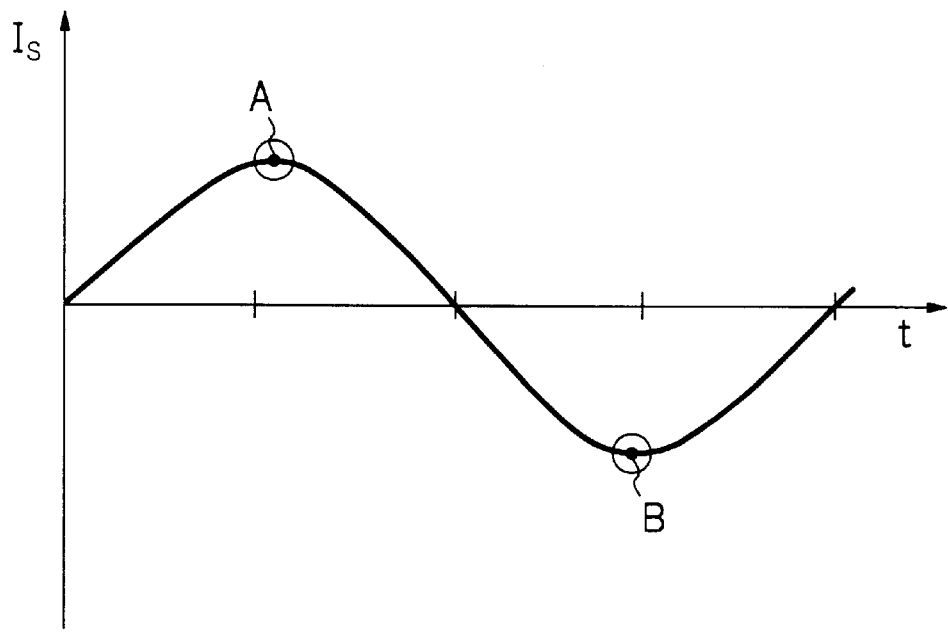
FIG. 6($a$) indicates an electric current of a scanning electromagnet of the second embodiment of the present invention, and FIG. 6($b$) shows an electric current of a focusing electromagnet of the second embodiment of the present invention.
Figure 6B:
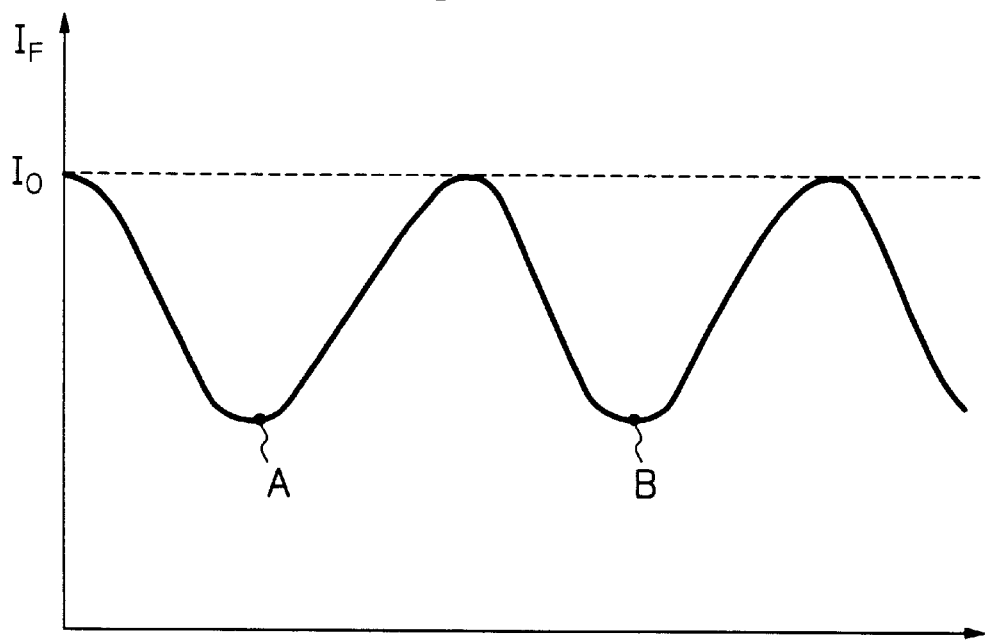

FIG. 6(a) indicates an electric current of a scanning electromagnet according to the second embodiment of the present invention, and FIG. 6(b) shows an electric current of a focusing electromagnet according to the second embodiment of the present invention. In this embodiment, the DC component $I_O$ of the electric current of the focusing electromagnet is a control current for reducing the beam diameter. Therefore, a sinusoidal AC electric current of a frequency twice as high as the electric current $I_S$ is superimposed to the DC current $I_O$ in such a manner as to be synchronized with the positive and negative peak values A and B of the sinusoidal wave of the electric current $I_S$ of the scanning electromagnet, in order to minimize the electric current $I_F$ of the focusing electromagnet. By means of the above construction, the beam diameter becomes maximum at the positive and negative maximum points of the sinusoidal wave of the electric current $I_S$ that is, at the maximum scanning values A and B. Therefore, when the magnetic field of the scanning electromagnet 17 becomes maximum and the beam diameter becomes ready to converge, the beam diameter is enlarged and the apparent focal length is lengthened, thereby avoiding problems of convergence of the electron beam on the irradiation window 15. It is noted that, since the deviation angle becomes zero at the position near the zero point of the electric current $I_S$ of the scanning electromagnet, the electric current $I_F$ of the focusing electromagnet becomes equal to $I_O$ and returns to the original beam diameter.

Figure 7A:
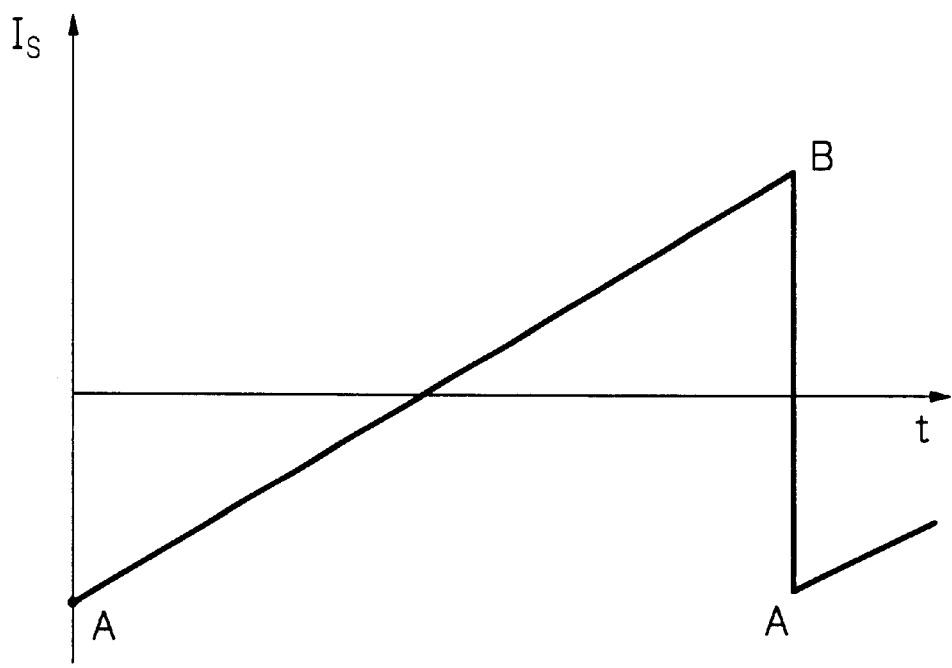
FIG. 7($a$) indicates an electric current of a scanning electromagnet of the third embodiment of the present invention, and FIG. 7($b$) shows an electric current of a focusing electromagnet of the third embodiment of the present invention.
Figure 7B:
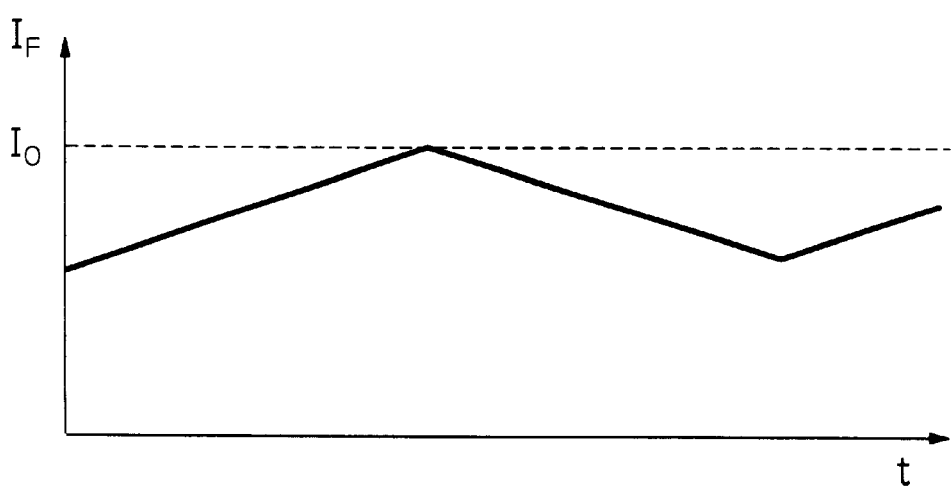

FIG. 7(a) indicates an electric current of a scanning electromagnet of the third embodiment of the present invention, and FIG. 7(b) shows an electric current of a focusing electromagnet of the third embodiment of the present invention. In this embodiment, a triangular waveform (saw-tooth waveform) is used for the X direction scan made by the scanning electromagnet 17, as shown in FIG. 7(a). That is, the magnetic field of the scanning electromagnet 17, into which an electron beam of a beam diameter controlled by the focusing electromagnet 16, enters, linearly changes from negative to positive directions with respect to time. Therefore, the electron beam is also deviated and scanned approximately linearly on the time axis from point A to point B in FIG. 7(b). For this reason, a triangular wave which is synchronized to the electric current of the scanning electromagnet is also used as the electric current $I_F$ of the focusing electromagnet 16, as shown in FIG. 7(b). That is, in this embodiment, the DC electric current component $I_O$ is an electric current for controlling to converge the beam diameter, and the electric current of the focusing electromagnet 16 is synchronized with the electric current $I_S$ of the scanning electromagnet 17 to form a triangular wave so that the triangular wave becomes minimum at the points A and B. Therefore, the beam diameter is controlled by the focusing electromagnet 16 to become maximum at the maximum scanning points A and B. By means of the above construction, it becomes possible to obviate the problem of convergence of the beam diameter at the maximum scanning points A and B, to obviate the damage of the irradiation window, and to supply an electron beam of a uniform energy density to a whole irradiated surface, similarly to those of the above embodiments.

In the above embodiments, the present invention has been described as an electron beam irradiation device for exhaust gas processing system, but the gist of the present invention is to obviate a focalizing phenomenon of an electron beam accompanied by the deviation angle at the time of scan made by the electron beam. Therefore, the idea of the present invention is widely applicable to a variety of devices which utilize electron beams such as an electron beam welding device, a scanning electron microscope, etc.

As mentioned above, according to the present invention, the problem of convergence of a beam can be avoided and irradiation of an electron beam at a uniform energy density over a wide scanning area can be achieved, even if a high energy electron beam is scanned with relatively wide deviation angle.

Although the invention has been described and illustrated in detail, it is clearly understood that the same is by way of illustration and example only.

What is claimed is:

1. An electron beam irradiation device comprising: an electron beam source; an accelerating tube for accelerating electrons emitted from said electron beam source; a focusing electromagnet for applying a magnetic field to a high energy electron beam, which is formed by said accelerating tube, to control a beam diameter of the electron beam; and a scanning electromagnet for applying a magnetic field to said electron beam to deflect and scan said diameter-controlled electron beam, said electron beam irradiation device characterized in that an electric current component which is synchronized with an electric current of said scanning electromagnet is superimposed on an electric current of said focusing electromagnet for controlling the electric current of said focusing electromagnet in such a manner that said beam diameter becomes maximum at the maximum points of said scan.

2. An electron beam irradiation device as claimed in claim 1 characterized in that an electric current of said scanning electromagnet is a sinusoidal AC electric current, that an electric current of said focusing electromagnet is formed by superimposing, on a DC electric current, a sinusoidal AC electric current which has a frequency twice as high as the electric current of said scanning electromagnet and that an electric current of said focusing electromagnet is controlled in synchronism so as to maximize said beam diameter at the maximum positive and negative values of the electric current of said scanning electromagnet.

3. An electron beam irradiation device as claimed in claim 1 characterized in that an electric current of said scanning electromagnet is a triangular-wave-shaped AC electric current, that an electric current of said focusing electromagnet is formed by superimposing, on a DC electric current, a triangular-wave-shaped AC electric current which has a frequency twice as high as the electric current of said scanning electromagnet and that an electric current of said focusing electromagnet is controlled in synchronism so as to maximize said bean diameter at the maximum positive and negative values of the electric current of said scanning electromagnet.

4. A method of irradiating an electron beam, characterized by the steps of: controlling a beam diameter of a high energy electron beam by applying a first magnetic field to said electron beam; applying a second magnetic field to said beam-diameter-controlled electron beam to deflect and scan said electron beam; and controlling said first magnetic field so that said beam diameter becomes maximum at the maximum points of said scan.

* * * * *